United States Patent [19]
Karnowski et al.

[11] Patent Number: 6,160,872
[45] Date of Patent: Dec. 12, 2000

[54] APPARATUS AND METHOD FOR PREVENTING DISCONNECTION OF CONSUMER PREMISES EQUIPMENT

[75] Inventors: Mark J. Karnowski, Long Beach; Stephen B. Knuth, Mission Viejo; Kevin R. Mullally, Redondo Beach, all of Calif.

[73] Assignee: Casio Communications, Inc., Torrance, Calif.

[21] Appl. No.: 09/110,312

[22] Filed: Jul. 6, 1998

Related U.S. Application Data

[60] Provisional application No. 60/071,541, Jan. 15, 1998.

[51] Int. Cl.$^7$ .................................................. H04M 11/00
[52] U.S. Cl. ........................................ 379/93.09; 379/194
[58] Field of Search .................. 379/93.01, 93.05–93.11, 379/93.17, 93.28, 93.37, 100.15, 100.16, 184, 194

[56] References Cited

U.S. PATENT DOCUMENTS

| | | | |
|---|---|---|---|
| 3,597,546 | 8/1971 | Zehr ....................................... | 379/93.37 |
| 4,471,489 | 9/1984 | Konetski et al. ...................... | 379/93.09 |
| 4,987,586 | 1/1991 | Gross et al. .......................... | 379/93.09 |
| 5,202,915 | 4/1993 | Nishii ................................... | 379/93.09 |
| 5,870,458 | 2/1999 | Pappas et al. ........................ | 379/93.11 |

FOREIGN PATENT DOCUMENTS

| | | | |
|---|---|---|---|
| 0392816 | 10/1990 | European Pat. Off. ............ | 379/93.09 |
| 0396105 | 11/1990 | European Pat. Off. ............ | 379/93.09 |

*Primary Examiner*—Wing F. Chan
*Attorney, Agent, or Firm*—Frishauf, Holtz, Goodman, Langer & Chick, P.C.

[57] ABSTRACT

An apparatus connected to a telephone line automatically detects the presence of modulated data (i.e. modem data, modem carrier signal, facsimile data and the like) that is being sent or received over the telephone line. The apparatus is used in conjunction with a consumer premises equipment (CPE) such as a telephone or the like, and detects a modem signal on the telephone line regardless if the CPE is in an on-hook or off-hook condition. If modem signals are present on the telephone line, the apparatus of the present invention will automatically prevent the CPE from seizing the telephone line (i.e. go off-hook). In addition, an audible or visual indication is provided to the user. For example, a visible "modem-in-use" indicator, such as a liquid crystal display (LCD) or an illuminated LED, or an audible signal such as a "beep" tone, speech signals or the actual modem signal, may be presented to the CPE attempting to go off-hook. Both the detection and indication of a modem signal on the telephone line are accomplished without interfering with the modem signal.

91 Claims, 7 Drawing Sheets

APPARATUS AND METHOD FOR PREVENTING DISCONNECTION OF CONSUMER PREMISES EQUIPMENT

CROSS-REFERENCE TO RELATED APPLICATION

The present application is a non-provisional application related to U.S. Provisional application Ser. No. 60/071,541 filed Jan. 15, 1998, the entire disclosure of which is incorporated herein by reference.

FIELD OF THE INVENTION

The present invention relates to a telephone line sharing apparatus and more particularly to an automatic telephone line sharing apparatus used in telephone subscriber systems having multiple consumer premises equipment coupled in parallel to a telephone line in which at least one of the multiple consumer premises equipment transmits or receives modem signals over the telephone line.

BACKGROUND OF THE INVENTION

It is common in small businesses and households to have multiple telephone devices coupled to a single telephone line. With increasing frequency, telephone lines are also being used in conjunction with data transmission/receiving devices such as modems, facsimile machines and the like, for transmitting and receiving data.

When using such data transmission/receiving devices, it is preferable to have two separate telephone lines, each dedicated to either voice or to data communication. However, because of the high costs involved in maintaining separate telephone lines for voice and data communication, it is common for voice and data transmission devices to share a telephone line.

Problems frequently occur when a data device and a telephone device share the same telephone line. For example, if a data device (e.g. modem) is communicating with another data device over the telephone line, and a telephone device connected to the same telephone line seizes the telephone line (i.e., goes off-hook), the electrical noise generated by the connection of the telephone device causes extraneous signals on the telephone line. These extraneous signals interfere with the transmission or reception of the modem signals. The interference distorts the data communication between the data devices, thereby corrupting the data and making the information unusable, or causing the modem session to be terminated. In either case, retransmission of the data is required which is particularly frustrating if a user was in the process of transmitting or receiving a large file.

There are devices which are connected between (CPE) consumer premises equipment (e.g. telephone, computer with a modem, facsimile machine and the like) and a telephone line in order to prevent the CPE from seizing the telephone line whenever another CPE, which shares the telephone line, is off-hook. These blocking devices sense the condition of the telephone line current or line voltage in order to determine whether to exclude the parallel devices commonly connected to the telephone line.

Unfortunately, these blocking devices block the CPE regardless of what is transpiring over the telephone line (i.e. voice conversation or modem transmission). As a result, if a voice conversation is occurring on the telephone line, the blocking device would prevent a person on a parallel telephone extension from joining in the conversation.

Some blocking devices offer a manually activated switch that enables the user to manually override the blocking function. However, because these blocking devices do not distinguish between voice communication and data communication over the telephone line, by manually overriding the blocking function, a user of the extension telephone could still inadvertently or purposefully interfere with a modem user on the telephone line. Additionally, a cordless telephone user would be inconvenienced by this approach, since the user would have to return to the cordless phone's base station (where the cordless phone is connected to the telephone line) in order to activate the manual override.

OBJECTS AND SUMMARY OF THE INVENTION

It is therefore an object of the present invention to provide an apparatus that detects the presence of a modem signal on a telephone line.

It is another object of the present invention to provide an apparatus that distinguishes between voice signals and modem signals on the telephone line.

It is a further object of the present invention to provide an apparatus that automatically prevents a consumer premises equipment (CPE) from seizing the telephone line if modem signals are detected on the telephone line.

It is yet another object of the present invention to provide an apparatus that allows a CPE to seize the telephone line if modem signals are not detected on the telephone line.

It is yet a further object of the present invention to provide an apparatus that allows a plurality of CPEs to seize the telephone line if modem signals are not detected on the telephone line.

It is still another object of the present invention to provide an apparatus that visually and/or audibly indicates when there are modem signals on the telephone line.

It is still a further object of the present invention to provide an apparatus that detects the presence of a modem signal prior to seizing the telephone line.

It is still yet another object of the present invention to provide an apparatus that does not require CPEs to be collocated.

It is another object of the present invention to provide an apparatus that distinguishes between a dial tone and modem signals on the telephone line.

In accordance with one form of the present invention, apparatus for controlling the seizure of a telephone line includes a detector for detecting a modem signal on the telephone line, and a telephone line interface coupling the detector to the telephone line and enabling the detector to monitor the telephone line without interfering with any modem signals on the telephone line. The apparatus also includes a speech network for processing receive and transmit audio signals, a microprocessor coupled to the detector for providing a control signal, and a switch responsive to the control signal for selectively coupling the speech network to the telephone line interface wherein the switch does not couple the telephone line interface to the speech network when the detector detects the presence of the modem signal on the telephone line.

In accordance with another form of the present invention, a method of controlling the seizure of a telephone line includes the steps of detecting whether there are modem signals on the telephone line, preventing the seizure of the telephone line if the modem signals are detected on the telephone line, and allowing the seizure of the telephone line if the modem signals are not detected on the telephone line.

In accordance with another form of the present invention, apparatus for controlling connection to a telephone line includes a detector for detecting signals on the telephone line wherein the detector discriminates between modem signals and speech signals present on the telephone line. The apparatus also includes a telephone line interface coupling the detector to the telephone line for enabling the detector to monitor the telephone line without interfering with any modem signals present on the telephone line. The apparatus further includes a coupling circuit having an input port and an output port wherein the coupling circuit input port is coupled to the telephone line, and wherein the coupling circuit selectively couples the telephone line to the output port wherein the coupling circuit does not couple the telephone line to the output port whenever the detector detects the modem signals on the telephone line.

In accordance with another form of the present invention, apparatus for indicating the presence of modem signals on a telephone line includes a detector for detecting signals on the telephone line and discriminating between modem signals and speech signals on the telephone line. The apparatus also includes a telephone line interface coupling the detector to the telephone line for enabling the detector to monitor the telephone line without interfering with modem signals present on the telephone line, and an indicator for indicating when the detector detects modem signals on the telephone line.

In accordance with another form of the present invention, a telephone apparatus which controls the seizure of a telephone line includes a detector for detecting signals on the telephone line wherein the detector discriminates between modem signals and speech signals present on the telephone line. The apparatus also includes a telephone line interface coupling the detector to the telephone line for enabling the detector to monitor the telephone line without interfering with modem signals present on the telephone line, and a line seizure circuit for selectively coupling the telephone line to the telephone apparatus, wherein the line seizure circuit is prevented from operatively coupling the telephone line to the telephone apparatus whenever the detector detects the modem signals on the telephone line.

In accordance with another form of the present invention, apparatus for controlling the coupling of a telephone line includes an off-hook sensor for detecting when the telephone line is seized, a detector for detecting modem signals present on the telephone line after the off-hook sensor detects that the telephone line is seized, and a coupling circuit having an input port and an output port wherein the coupling circuit input port is coupled to the telephone line and wherein the coupling circuit selectively couples the telephone line to the output port and wherein the coupling circuit does not couple the telephone line to the output port whenever the detector detects the modem signals on the telephone line.

In accordance with another form of the present invention, a telephone apparatus which controls the seizure of a telephone line includes an off-hook sensor for detecting when the telephone line is seized, a detector for detecting modem signals on the telephone line after the off-hook sensor detects that the telephone line is seized, and a line seizure circuit for selectively coupling the telephone line to the telephone apparatus, wherein the line seizure circuit is prevented from operatively coupling the telephone line to the telephone apparatus whenever the detector detects the presence of modem signals on the telephone line.

In accordance with another form of the present invention a telephone apparatus which controls the seizure of a telephone line includes a detector for detecting the presence of modem signals on the telephone line, an indicator for providing an indication as to the presence of modem signals on the telephone line, and a line seizure circuit for selectively coupling the telephone line to the telephone apparatus, wherein the line seizure circuit is prevented from operatively coupling the telephone line to the telephone apparatus whenever the detector detects the presence of modem signals on the telephone line.

These and other objects, embodiments, features and advantages of this invention will be apparent from the following detailed description of illustrative embodiments thereof, which is to be read in connection with the accompanying drawings.

BRIEF DESCRIPTION OF THE DRAWINGS

FIG. 6b is a schematic diagram showing an embodiment of the present invention and the points of attachment to the standard telephone device shown in FIG. 6a.

DETAILED DESCRIPTION OF THE PREFERRED EMBODIMENTS

Figure 1:
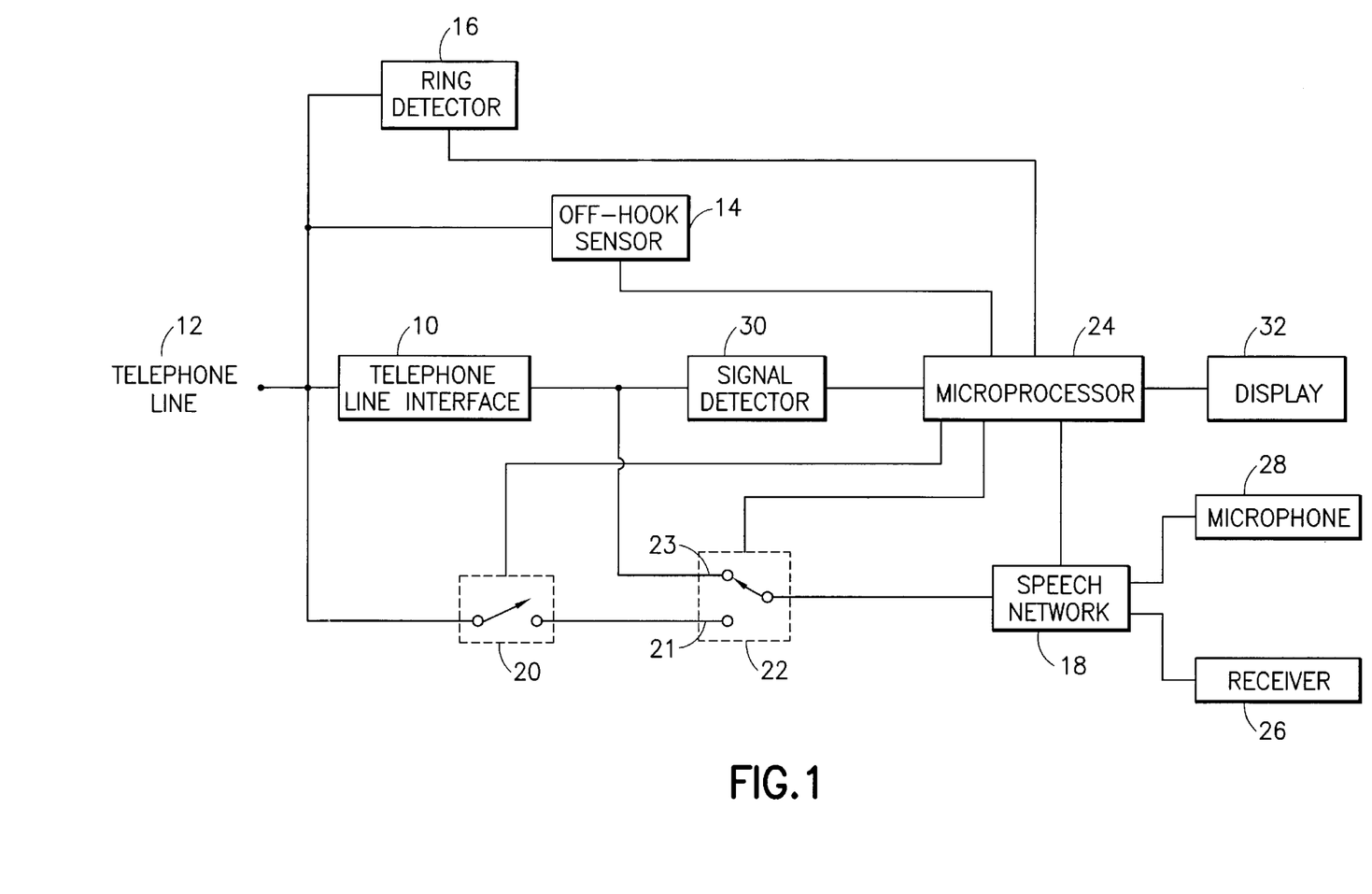
FIG. 1 is a block diagram of a consumer premises equipment (CPE) in accordance with a first embodiment of the present invention.

Referring initially to FIG. 1, a block diagram of a (CPE) consumer premises equipment (e.g. telephone base unit and receiver) in accordance with a preferred embodiment of the present invention is shown.

The CPE in accordance with the present invention includes a telephone line interface 10 coupled to a telephone line 12 of a telephone operating system. The telephone line interface 10 is preferably a high impedance interface so as to monitor the telephone line without adversely affecting the phase response of any modem signals on the telephone line. Without a high impedance telephone line interface, the CPE would need to seize the telephone line in order to monitor the modem signal. In this case, the impedance characteristics of the telephone line may be sufficiently altered so as to interfere with the transmission or reception of the modem signal.

The telephone line is also coupled to an off-hook sensor 14. The off-hook sensor determines whether the telephone line is in an "on-hook" or an "off-hook" condition. Generally, the "on" or "off" hook condition is determined by monitoring the DC voltage on the telephone line. A ring detector 16 is also coupled to the telephone line 12. The ring detector alerts the CPE that a call has arrived. A speech network 18 is also operatively coupled to the telephone line 12 via a hook switch 20 and a first contact 21 of a single pole, double throw (SPDT) switch 22, which are operatively controlled by a microprocessor 24 or other type of control circuit. The hook switch 20 and the SPDT switch 22 are used to selectively place the CPE either in the on-hook or off-hook condition. The speech network 18 processes received signals from the telephone line 12 via the hook switch 20 and the first contact 21 of the SPDT switch 22 and outputs the processed received signals to a receiver 26 (for example, earphone or loudspeaker). The speech network 18 is also operatively coupled to a microphone 28. The speech network processes transmit signals provided by the microphone 28 and outputs the processed transmit signals to the telephone line 12 via the hook switch 20 and SPDT switch 22.

The telephone line interface 10 is operatively coupled to a second contact 23 of the SPDT switch 22. Under the control of the microprocessor 24, the second contact 23 of the SPDT switch operatively couples the telephone line interface 10 to the speech network 18 when there are modem signals on the telephone line. Thus, modem signals may be provided to the receiver 26 without seizing the telephone line and interfering with the modem data. This provides the user with an indication that the telephone line is occupied with a modem call and may not be used for voice communication. Of course, using the SPDT switch 22 to indicate that the telephone line is occupied is optional, and other methods of switching and indication may be used.

The telephone line interface 10 is also operatively coupled to a signal detector 30. All audio frequency signals present on the telephone line 12, including voice and modulated data (i.e. modem signals) are input to the signal detector 30. The signal detector 30, whose output is coupled to a microprocessor 24, detects the existence of these voice and modem signals and provides representative signals to the microprocessor 24 for processing. In a preferred embodiment, the signal detector 30 comprises an envelope detector which is able to detect an energy level within the audio band.

Since modem signals are superimposed on a carrier signal that is constantly above a minimum audio energy level, the signal detector 30 measures the audio energy and therefore easily detects the presence of modem signals. For example, modulated data signals generated by a facsimile machine have a 300 baud back channel which provides a constant audio energy level. Since, by nature, voice signals have varying energy levels and points of relative silence, the audio energy level of voice signals will regularly fall below a minimum threshold energy level and therefore, voice signals are easily distinguished from modem signals. For example, if the audio energy level of a signal appearing on the telephone line 12 does not drop below a threshold value over a period of time, the signal may be categorized as a modem signal. It should be noted that since modem signals are superimposed on a carrier signal, the signal detector of the present invention may also comprise a carrier detector which is commonly found within modems.

It should be noted that a typical telephone line interface will generally provide signal filtering as well as 60 Hz common mode rejection of signals from the telephone line. However, because of component mismatch due to component tolerances, perfect common mode rejection is rarely achieved. Therefore, it is advantageous to include a bandpass filter between the telephone line interface 10 and the signal detector 30 to insure that no extraneous signals are passed to the modem detector 30 that could be misinterpreted as a modem signal of course, if the telephone line interface does not provide signal filtering and/or common mode rejection, separate circuits may be utilized.

Although these embodiments enable the present invention to continuously monitor the telephone line 12 for modem signals prior to seizing the telephone line, the present invention may also first determine that there is a device off-hook on the telephone line and thereafter monitor the telephone line for modem signals. Thus, the present invention would only monitor the telephone line for modem signals when a device is detected to be off-hook on the telephone line. The off-hook sensor 14 would monitor the DC voltage on the telephone line 12. If there are no devices on the line, the DC line voltage would be around 50 volts. Typically, when a device goes off-hook (including modems), the DC line voltage will drop to around 6–10 volts. Therefore, the signal detector 30 would be instructed by the microprocessor 12 to begin monitoring the telephone line once the off-hook sensor 14 detects that the DC voltage on the telephone line 12 drops below a threshold value, for example, 20 volts.

Figure 3:
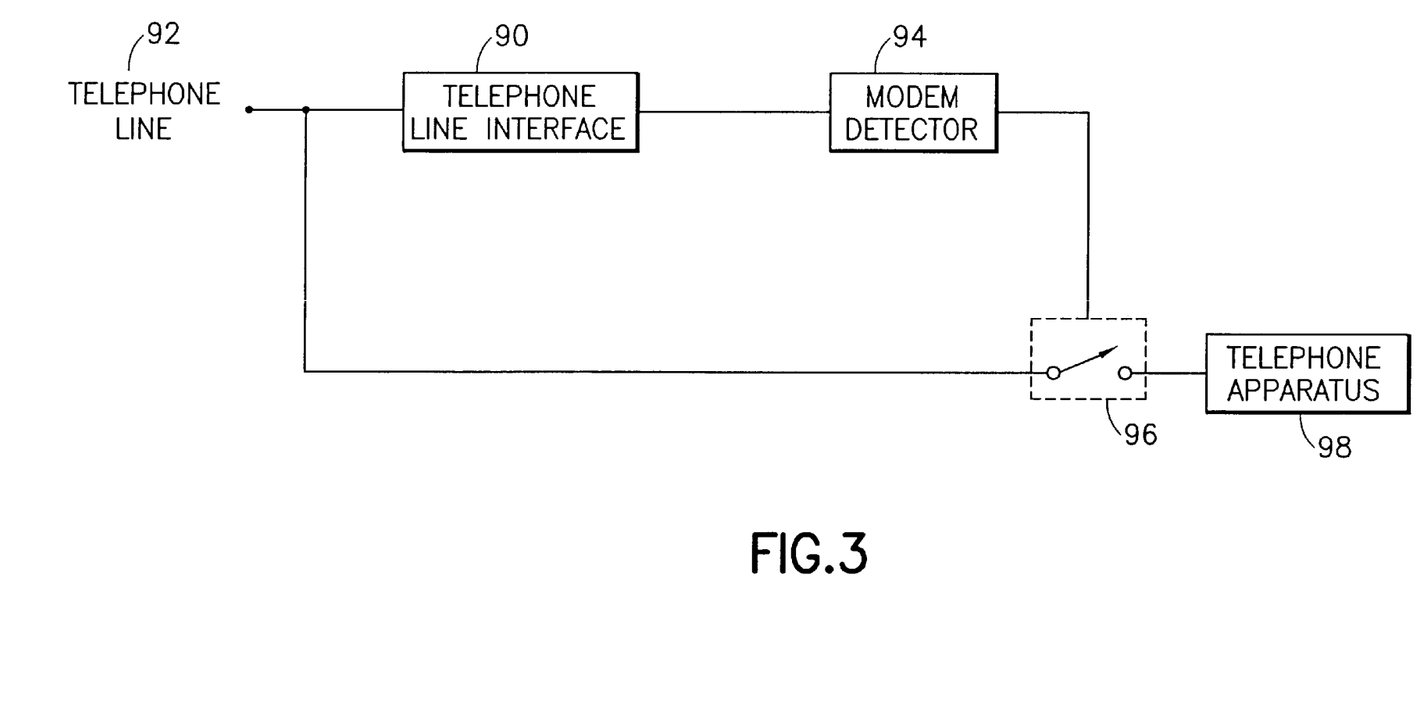
FIG. 3 is a block diagram of a CPE in accordance with another embodiment of the present invention.

Referring now to FIG. 3, a block diagram of a CPE in accordance with an alternate embodiment of the present invention is shown. The CPE in accordance with the alternate embodiment includes a telephone line interface 90 coupled to a telephone line 92 of a telephone operating system. The telephone line interface 90 is coupled to a modem detector 94 for distinguishing between modem signals and non-modem signals on the telephone line. As mentioned previously, modem signals are constant signals with a minimum audio energy level. Non-modem signals are signals in which the audio energy level periodically falls below a minimum value. The output of the modem detector 94 controls a switch 96 which selectively couples the telephone line 92 to a telephone apparatus 98. The telephone apparatus may be any device that may be operatively coupled to a telephone line, such as telephones, telephone answering devices, facsimile machines, modems, telephone adjuncts, and the like.

Figure 4:
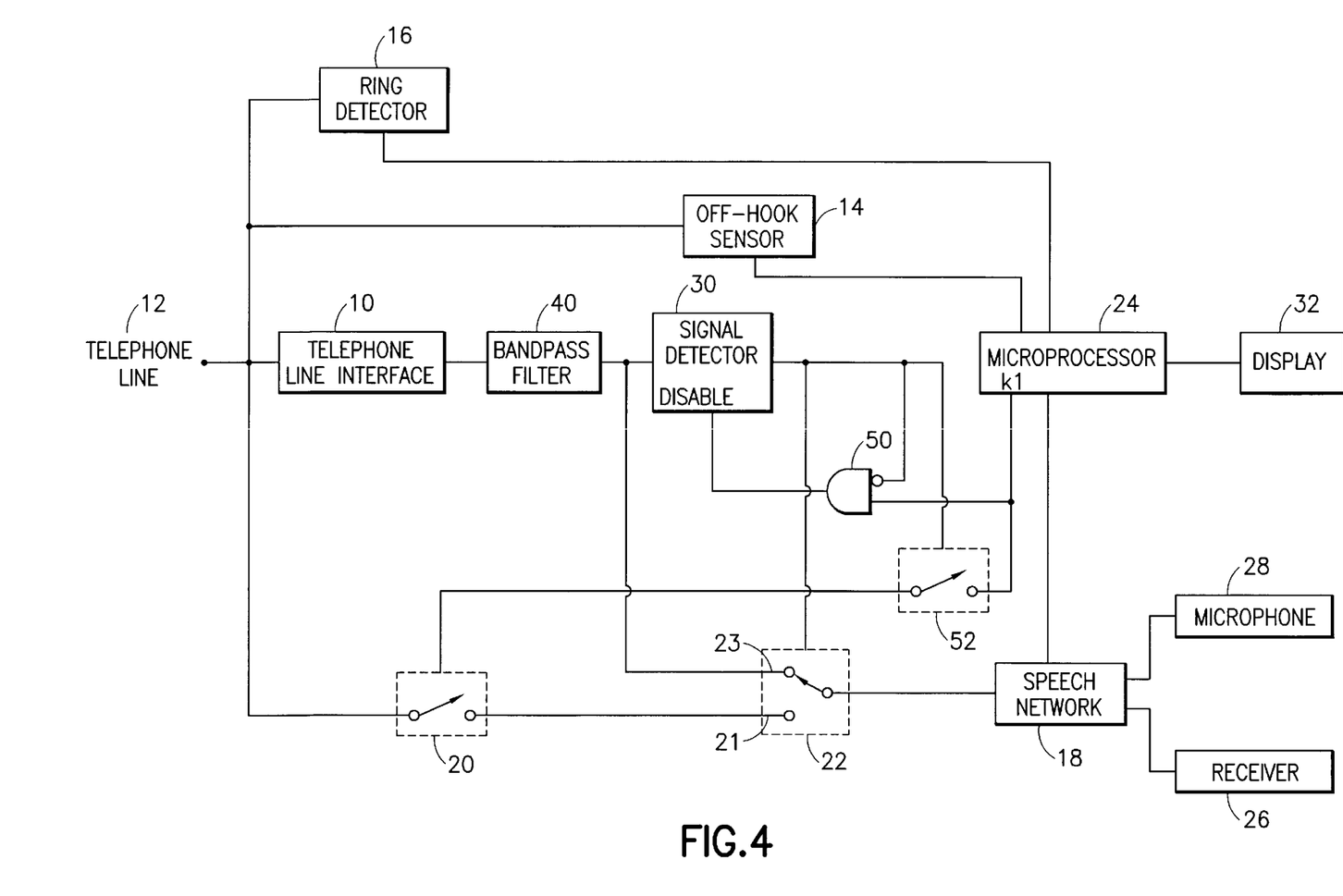
FIG. 4 is a block diagram of a CPE in accordance with yet another embodiment of the present invention.

Referring now to FIG. 4, a block diagram of a CPE in accordance with another embodiment of the present invention is shown wherein like reference numerals will be utilized. The CPE in accordance with this embodiment includes a telephone line interface 10 coupled to a telephone line 12 of a telephone operating system. The telephone line 12 is coupled to an off-hook sensor 14 for determining whether the telephone line is in an "on-hook" or "off-hook" condition. The off-hook sensor provides an indication of the condition of telephone line 12 to a microprocessor 24 or another type of control or logic circuit. A ring detector 16 is also coupled to the telephone line 12. Ring detector 16 indicates to the microprocessor 24 that an incoming call has arrived.

The output of the telephone line interface 10 is operatively coupled via a bandpass filter 40 to a signal detector 30. Audio frequency signals transmitted over the telephone line 12, including voice and modulated data (i.e. modem signals) are filtered (via bandpass filter 40) and presented to the input of signal detector 30. The signal detector 30, detects whether the signal received over the telephone line 12 is a constant signal, that is, a signal with an audio energy level always greater than a predetermined threshold value (e.g. modem signals), or a signal whose audio energy occasionally drops below the threshold value (e.g. voice).

The signal detector 30 provides an output depending on the type of signal being transmitted over the telephone line 12. In the present invention, the signal detector 30 output is "high" if a modem-type signal is detected. The signal detector output is "low" if a voice-type signal is detected over the telephone line 12.

A speech network 18 is operatively coupled to the telephone line 12 via a hook switch 20 and a first contact 21 of a single pole, double throw (SPDT) switch 22. The hook switch 20 and the SPDT switch 22 are used to selectively place the CPE in an on-hook condition. The speech network is coupled to a microphone 20 and a receiver 26. It should be noted that the speech network 18 may be any electrical circuit that operatively couples a transmitter (i.e. microphone 20) and a receiver to a telephone line as well as to each other.

The telephone line interface 10 is operatively coupled to a second contact 23 of the SPDT switch 22 via the bandpass filter 40. The second contact 23 of the SPDT switch 22 is used to operatively couple the telephone line interface 10 to the speech network 18 when there are modem signals on the telephone line. Thus, modem signals may be provided to the receiver 26 without seizing the telephone line or interfering with the modem data.

The SPDT switch 22 is operatively controlled by the output of the signal detector 30. When the output of signal detector 30 is "low", the SPDT switch 22 connects to a first contact 21, thereby operatively coupling hook switch 20 to the speech network 18. When the output of signal detector 30 is "high", the SPDT switch connects to second contact 23, thereby operatively coupling the telephone line interface 10 (via the bandpass filter 40) to speech network 18.

The microprocessor 24 is capable of determining when the CPE itself attempts to go off-hook, such as when a handset is lifted out of its cradle or when the "TALK" button of a cordless handset is pressed (not shown). In the present invention, when the CPE attempts to go off-hook, the microprocessor 24 provides a control signal K1 via a K1 output of the microprocessor 24. The control signal K1 is "high" when the CPE is attempting to go off-hook and "low" when the CPE is on-hook.

Recall that an object of the present invention is to prevent the CPE from seizing the telephone line when modem signals are detected on the telephone line and to allow the CPE to seize the telephone line if no modem signals are detected on the telephone line. If the CPE attempts to go off-hook when modem signals have been detected on the telephone line, the CPE does not go off-hook in order to prevent interruption of the modem call. However, if the CPE attempts to go off-hook during a non-modem call, the CPE is allowed to seize the telephone line. Once this occurs, it is safe to assume that a modem signal will not be established during the same call. That is, a new call must begin in order for a modem signal to be established on the telephone line. Therefore, once a voice transmission has been detected on the telephone line during a particular call, thereby allowing the CPE to seize the telephone line, and the CPE has seized the line, it is not necessary for the CPE to monitor the telephone line for modem signals until the CPE goes back on-hook, regardless of whether or not the detector subsequently detects modem-like signals on the telephone line.

The signal detector 30 is provided with a "DISABLE" input, such that, for a given call, if the DISABLE input is "low", the signal detector 30 continues to monitor the telephone line for modem signals. The signal detector will output a "high" if modem signals are detected and output a "low" if non-modem signals are detected. However, if the DISABLE input is "high", the signal detector 30 will output a "low". Once the DISABLE input is "high", the signal detector will output a "low" regardless if the signal detector 30 subsequently detects modem-type signals during the call.

The output of the signal detector 30 and the control signal K1 from microprocessor 24 are input into a logic gate 50. Note that the output of the signal detector 30 that is input into the logic gate 50 is inverted. Therefore, only when both non-modem signals are detected and the CPE is off-hook (K1 is "high") will the DISABLE input be "high".

Hook switch 20 is operatively controlled by control signal K1. When control signal K1 is "high", hook switch 20 is closed. When control signal K1 is "low", hook switch 20 is open. The control signal K1 is provided to hook switch 20 only when a control switch 52 is closed. Control switch 52 is operatively controlled by the output of the signal detector 30. When the signal detector 30 detects a modem signal, the output of the signal detector 30 is "high" and the control switch 52 is open. Therefore, if the CPE attempts to go off-hook when modem signals are detected, the control signal K1 needed to close hook switch 20 is interrupted and the CPE is prevented from seizing the telephone line when the CPE attempts to go off-hook. However, when modem signals are not detected, the output of the signal detector 30 is "low" and the control switch 52 is closed, thereby allowing the control signal K1 to reach the hook switch 20.

Since a telephone's dial tone is a constant signal of a minimum audio energy, the signal detector 30 may confuse the dial tone with a modem signal. Therefore, dial tone rejection would be advantageous. In an alternative embodiment of the present invention, the ring detector 16, used in conjunction with the off-hook sensor 14, provides dial tone rejection. If a constant tone having constant audio energy is detected by the signal detector 30 and the ring detector 16 did not detect a ring a predetermined time period prior to the off-hook sensor 14 detecting that the telephone line is off-hook, then the constant tone may be determined to be a dial tone. In this case, the device waits until the audio energy level drops below a threshold value (indicating that the dial tone has stopped due to the commencement of dialing) before monitoring the telephone line for a modem signal.

Alternatively, a pair of analog or digital filters may also be used to provide dial tone rejection. Since the dial tone includes a pair of tones, the filters are selected such that each of the tones within the dial tone could be detected. These filters can be implemented with additional hardware. Alternatively, the dial tone can be detected by a Digital Signal Processor (DSP) not shown.

The microprocessor 24 is also operatively coupled to an indicator (display) 32 for visually displaying the presence of modem signals on the telephone line to the user. For example, display 32 includes an LCD which displays "modem-in-use". Alternatively, an LED is illuminated to provide an indication to a user that the modem is in use. In addition, microprocessor 24 provides "beep" signals or passes the received modem signals to the receiver 26 to thereby provide an audible indication to the user when there are modem signals present on the telephone line.

The microprocessor 24 functions as the control hub of the CPE. The microprocessor responds to signals from the off-hook sensor 14, the ring detector 16, and the signal detector 30 to provide control signals to the display 32, as well as the hook switch 20 to control whether or not the CPE seizes the line.

Figure 2:
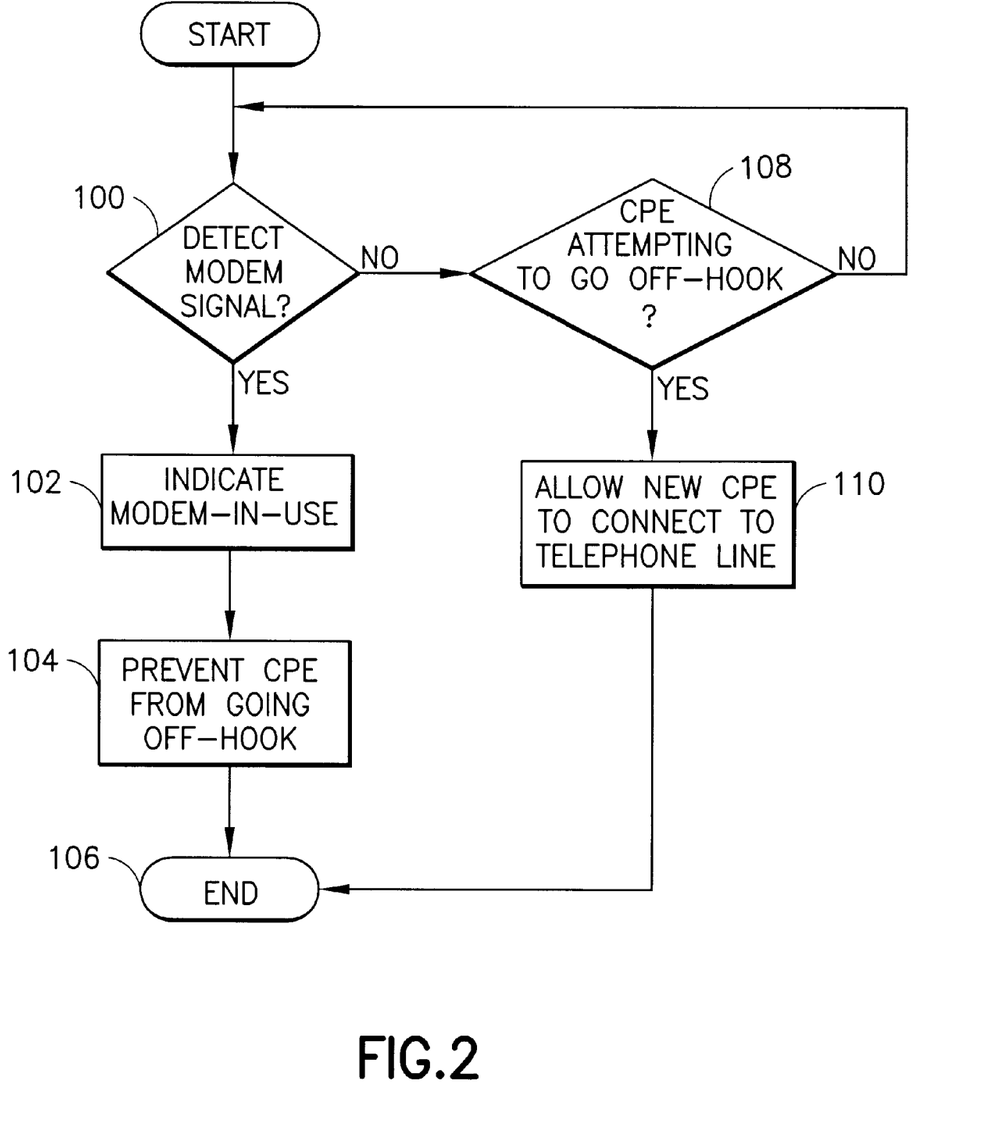
FIG. 2 is a flow diagram showing a first embodiment of the operation of the present invention.

Referring now to FIG. 2, the operation of the CPE in accordance with the first embodiment of present invention will now be described. The CPE continuously monitors the telephone line for the presence of modem signals (Step 100). If modem signals are detected on the telephone line (Yes in Step 100), a modem-in-use indication is activated (Step 102), the CPE is prevented from going off-hook (Step 104) and the method ends (Step 106).

At Step 100, if modem signals are not detected on the telephone line (NO in Step 100), the CPE checks to see if the CPE is attempting to go off-hook (Step 108). If the CPE is not attempting to go off-hook (NO in Step 108), the method returns to Step 100 to determine if a modem signal has been detected on the telephone line. However, if the CPE is attempting to go off-hook (YES in Step 108), the CPE is allowed to connect to the telephone line (Step 110).

The telephone line will basically be in one of three states: 1) on-hook; 2) off-hook with voice signals on the telephone line; or 3) off-hook with modem signals on the telephone line. In the first case, regardless of how the CPE is attempting to access the telephone line (i.e. for the purpose of voice conversation or sending/receiving modem signals), the CPE will be able to connect to the telephone line. In the second case, the CPE will be able to connect to the telephone line in order to participate in the existing voice conversation. Generally, modems are required to sense a dial tone before they attempt to send signals over the telephone line. Furthermore, a modem's momentary seizure of the line to check for a dial tone will not impede conversation or drop the call. Therefore, a user does not have to worry about being interrupted or disconnected by someone trying to use their modem in the middle of a voice conversation. In the third case, the CPE will not be able to connect to the telephone line, regardless of the purpose.

Although one objective of the present invention is to prevent the intentional or unintentional interruption of a modem call, the present invention may easily be equipped with an override capability in order to interrupt the modem call. For example, in a cordless telephone system, the user may press the "TALK" key in order to attempt to seize the telephone line. If modem signals are detected on the telephone line, the user is given an indication that a modem is currently in use on the telephone line and the cordless telephone is not allowed to seize the telephone line. However, if the user determines that it is necessary to override the modem call, the user may do so by, for example, pressing the "TALK" key again or any other key or sequence of keys. After the modem call has been terminated, the user may seize the telephone line to place a call as conventional. The override capability may be embodied in a hardware circuit, such as a switch circuit, or may be provided by a control circuit to override any control signal that prevents the interruption of a modem call.

Figure 5:
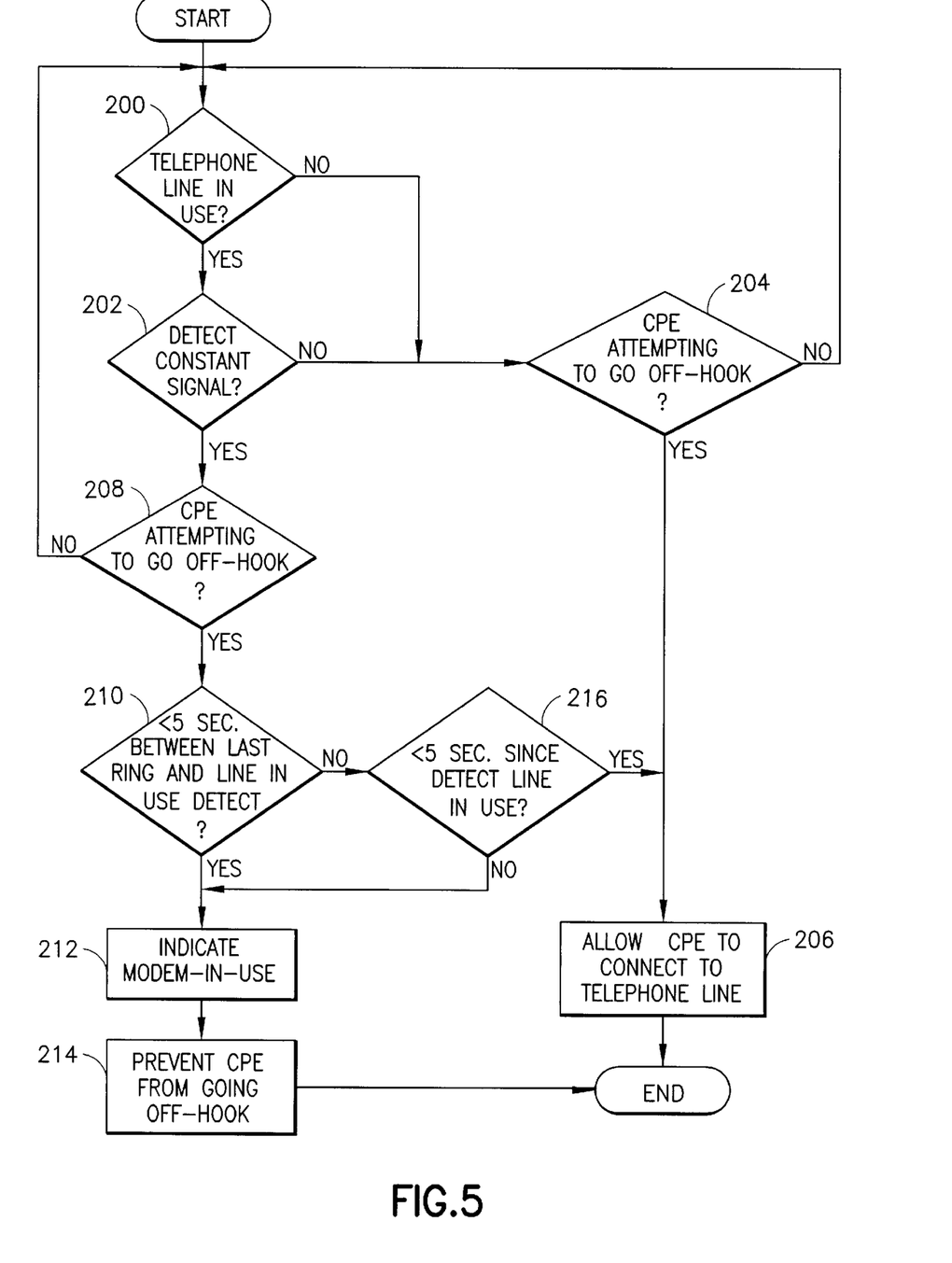
FIG. 5 is a flow diagram showing another embodiment of the operation of the present invention.

Referring now to FIG. 5, the operation of the CPE utilizing a method of dial tone rejection in accordance with the present invention is shown. Initially, the CPE determines if the telephone line is in use (Step 200). If the telephone line is not in use, the CPE determines if the CPE itself is attempting to go off-hook (Step 204).

At Step 204, if the CPE is not attempting to go off-hook (NO in Step 204), the method returns to Step 200. If the CPE is attempting to go off-hook (YES in Step 204), since a modem signal has not been detected on the telephone line, the CPE is allowed to connect to the telephone line (Step 206) and the method ends.

Referring back to Step 200, if the telephone line is in use (YES in Step 200), the CPE determines if there is a constant signal of an audible energy level greater than a predetermined value (i.e. a modem signal or dial tone) (Step 202). If the CPE does not detect such a constant signal (NO in Step 202), the CPE determines whether the CPE itself is attempting to go off-hook (Step 204).

If the CPE detects a constant signal (YES in Step 202), the CPE must determine if the constant signal is a modem signal or a dial tone. One method for distinguishing between the two signals is to determine if the CPE detects a constant signal subsequent to answering an incoming call. Since a dial tone is not provided subsequent to answering an incoming call, it may be assumed that the detected constant signal is a modem signal.

At Step 202, if the CPE detects a constant signal (YES in Step 202), the CPE determines if it is attempting to go off-hook (Step 208). If the CPE is not attempting to go off-hook (NO in Step 208), the method returns to Step 200. If the CPE is attempting to go off-hook (YES in Step 208), the CPE determines if a ring was detected less than a predetermined period of time (e.g. five seconds) before the telephone line went to the in-use state (Step 210). If a ring is detected less than the predetermined period of time before the telephone line went to the in-use state (YES in Step 210), the constant signal is determined to be a modem signal. That is, the use of the telephone line has been determined to be in response to an incoming call. Since a constant signal is detected, the CPE determines that the incoming call is a modem call. Therefore, the CPE indicates to the user that a modem is in use (Step 212), the CPE is prevented from connecting to the telephone line (Step 214) and the method ends.

At Step 210, if the elapsed time since the last ring is greater than five seconds (NO in Step 210), the telephone usage is not in response to an incoming call. The CPE then determines whether the detected constant signal is actually a dial tone rather than a modem signal. Generally when the telephone line is first seized (but not in response to an incoming call), after a certain period of time or after a telephone key is pressed (i.e. when a user starts dialing a telephone number) the dial tone will disappear. Therefore, the CPE determines if it has been less than a second predetermined period of time (e.g. five seconds) since the telephone line-in-use was detected. If the second period of time is less than five seconds (YES in Step 216), the detected constant signal is determined to be a dial tone. As a result, the CPE is permitted to connect to the telephone line (Step 206) and the method ends. However, if the second period of time is more than five seconds (NO in Step 216), the detected constant signal is determined to be a modem signal. Therefore, the CPE indicates to the user that a modem is in use (Step 212), the CPE is prevented from connecting to the telephone line (Step 214) and the method ends. It should be noted that the present invention is clearly and easily adaptable to an embodiment for only indicating the presence of a modem signal on the telephone line without including the aspect of preventing a CPE from connecting to the telephone line.

The present invention can easily be implemented in a variety of products including corded telephones, cordless telephones, CPE with caller-identification (CID), CPE with CID and call-waiting, multi-line telephones, telephones with integrated answering machines, and adjunct boxes. Some of these products will already have some of the required circuitry, and will thereby allow this invention to be added at a relatively small hardware cost. For example, caller ID products have a high impedance interface to monitor the audio signals on the telephone line. This circuit could be used as the telephone line interface 10 described above.

Figure 6A:
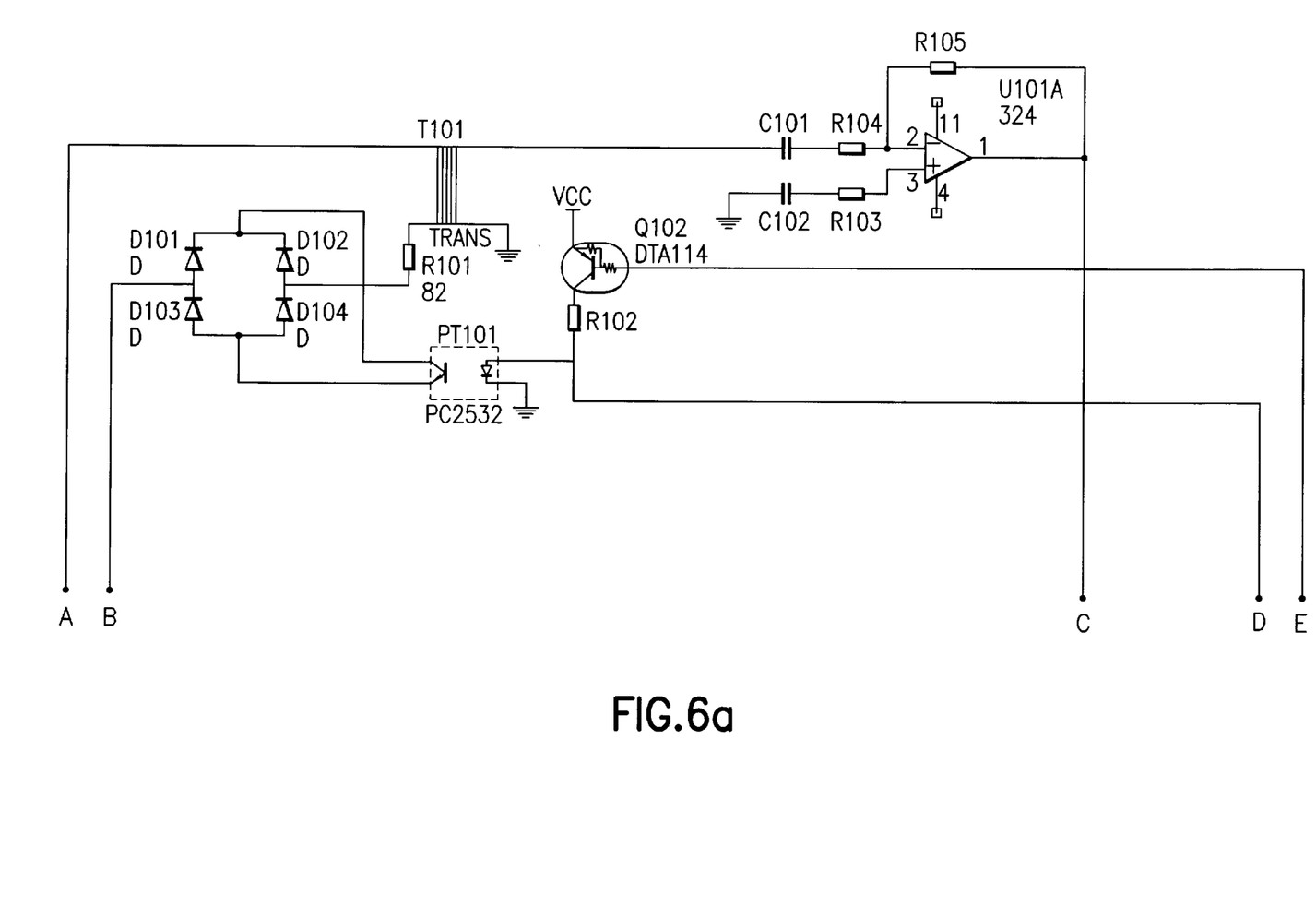
FIG. 6a is a schematic diagram representative of portions of a standard telephone.
Figure 6B:
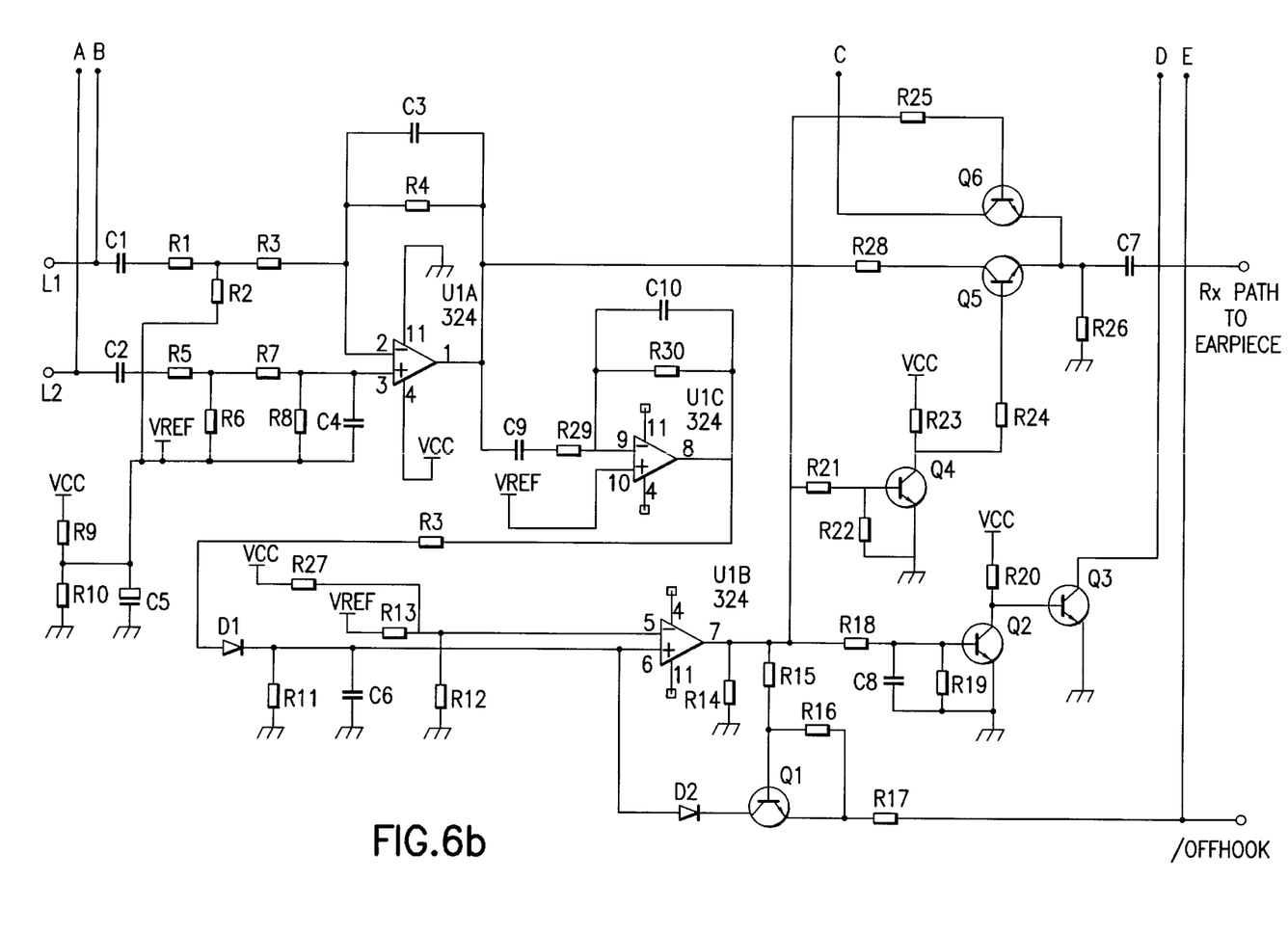

Referring now to FIGS. 6a and 6b, a schematic diagram of a CPE in accordance with another embodiment of the present invention is shown. FIG. 6a is representative of portions of a standard telephone and FIG. 6b is representative of the present invention.

Referring initially to FIG. 6b, the CPE in accordance with the present invention includes connectors L1 and L2, commonly respectively referred to as tip and ring connectors, coupled to a telephone line (not shown) of a telephone operating system. L1 and L2 are operatively coupled to a differential amplifier circuit 300 comprising an operational amplifier U1A which is used to reject common mode signals received over the telephone line. Resistors R1, R2, R5 and R6 comprise a passive voltage divider. The passive voltage divider prevents common mode signals received from the telephone line from exceeding the voltage rails of U1A at pins 2 and 3 of U1A. In addition, capacitors C1 and C2 are provided to filter out 60 Hz common mode and differential mode voltages. Resistors R4 and R8, along with capacitors C3 and C4, comprise a bandpass filter with a zero at about 1 kHz and a pole at about 5 kHz, which are provided to filter out signals below 1 kHz and above 5 kHz. The DC voltage output of the differential amplifier circuit 300 is maintained at Vref and modem and speech signals received over the telephone line will result in an AC signal superimposed on Vref. Filtering high frequencies is not as much of a concern as filtering low frequency signals. Therefore a 5 kHz high pass filter is used, so that the attenuation at 3.3 kHz is less than 3 dB.

Since component tolerance mismatch can allow some common mode voltage to pass through the differential amplifier circuit 300, an additional bandpass filter is useful. In the present embodiment, resistors R29 and R30, along with capacitors C9 and C10, comprise another bandpass filter 302 with a zero at about 1 kHz and a pole at about 10 kHz to filter out the signals below 1 kHz and above 10 kHz that may have passed through the differential amplifier circuit 300. The particular filter values are chosen because modem signals are generally broadband signals ranging from 300 Hz to 3300 Hz, and even though much of the modem signal below 1 kHz is filtered out as a result of the bandpass filters, the presence of modem signals is easily detected due to the significant audio energy levels from 1 kHz to 3 kHz that will be seen at the output of pin 8 of operational amplifier U1C.

A peak detector comprising diode D1, capacitor C6, and resistors R11, R12, R13 and R27 are provided to peak detect the peak of the 1–3 kHz audio signals. Resistor R11 provides a discharge path for the peak detector. Resistors R12, R13 and R27 are provided to set the reference level of the peak detector. If the peak detector detects an audio signal above the set reference level, it is determined that an audio signal has been received over the telephone line that may be a modem signal and the voltage at pin 7 of operational amplifier U1B reaches approximately zero volts (U1B is low). Consequently transistors Q1, Q2, Q4 and Q6 are turned OFF, while transistors Q3 and Q5 are turned ON.

When the telephone is on-hook (/OFFHOOK is HIGH) and thereby not seizing the telephone line, opto-isolator PT101 (see FIG. 6a) is OFF. When the telephone is off-hook (/OFFHOOK is LOW) and the telephone line is seized, PT101 is ON. When the peak detector detects audio signals above the reference level and U1B is low, Q3 is turned ON. When Q3 is ON, the anode of PT101 is clamped to approximately zero volts, thereby preventing the telephone from seizing the telephone line.

If there is no audio signal on the telephone line, the output of the bandpass filter 302 (pin 8 of U1C) will be at Vref with little or no AC signal superimposed on Vref. If capacitor C6 of the peak detector is significantly discharged, the output of U1C (pin 8 of U1C) will not be enough to increase the voltage at pin 6 of U1B to be above the reference level (set by resistors R12, R13 and R27) of the peak detector. Therefore, the output at pin 7 of U1B will saturate to Vcc, causing Q1, Q2, Q4 and Q6 to be turned ON, and Q3 and Q5 turned OFF. If the CPE seizes the telephone line while Q1 is turned ON, Q1 latches pin 7 of U1B HIGH thereby effectively disabling any further detection of modem signals. That is, since the CPE will not seize the telephone line when modem signals are detected on the telephone line, if pin 7 of U1B is HIGH (indicating that there are no modem signals on the telephone line), Q1 latches pin 7 of U1B HIGH thereby preventing the CPE from disconnecting from the telephone line should subsequent modem-type signals be detected. The following table shows the relationship between /OFFHOOK and Q3:

| /OFFHOOK | Q3 | Seize Line? | Comments |
|---|---|---|---|
| LOW | OFF | Yes | No modem or speech is detected on the telephone line; CPE is attempting to go off-hook; CPE is allowed to seize the telephone line. |
| LOW | ON | No | Modem or speech is detected on the telephone line; CPE is attempting to go off-hook; CPE is prevented front seizing the telephone line. |
| HIGH | OFF | No | CPE is not attempting to seize the line. |
| HIGH | ON | No | CPE is not attempting to seize the line. |

If there are modem signals on the telephone line and the CPE is on-hook, /OFFHOOK is set HIGH and the output of U1B (pin 7 of U1B) is always LOW. If the CPE attempts to seize the telephone line, /OFFHOOK is set to LOW and the output of U1B remains LOW. When the output of U1B is LOW, transistor Q3 is ON thereby causing PT101 to remain OFF and the CPE is prevented from seizing the telephone line.

If the telephone line is seized and speech is detected on the telephone line while the CPE is on-hook, /OFFHOOK is set HIGH and the output of U1B (pin 7 of U1B) is LOW during instantaneous speech and the output of U1B is HIGH during pauses between words and syllables. If the CPE attempts to seize the telephone line, /OFFHOOK is set LOW and assuming the presence of instantaneous speech at this moment, the output of U1B (pin 7) is LOW. When the output of U1B is LOW, transistor Q3 is turned ON thereby causing PT101 to remain OFF and the CPE is prevented from seizing the telephone line.

However, when a gap in the speech signals is detected, the output of U1B goes HIGH. When the output of U1B is HIGH, transistor Q3 turns OFF while transistor Q1 turns ON. Because /OFFHOOK is LOW and Q1 is ON, the voltage at pin 6 of U1B is pulled closer to ground through resistor R17, effectively preventing U1B from going LOW and preventing the CPE from seizing the telephone line. Transistor Q3 remains OFF until the CPE disconnects from the telephone line (/OFFHOOK goes HIGH). When the CPE goes back on-hook, /OFFHOOK is set HIGH and transistor Q1 is turned OFF, thereby allowing U1B to go HIGH again.

It should be noted that the resistor ratios of R3, R11 and R17 guarantee that the voltage at pin 6 of U1B is always below pin 5 of U1B whenever Q1 is ON (U1B-7 HIGH) and /OFFHOOK is LOW.

Transistor Q1, diode D2 and resistors R14, R15, R16 and R17 effectively comprise a latching circuit.

Since U1A, U1B and U1C are operational amplifiers and not comparators, when saturated LOW, their outputs may not be very close to 0V, and could be up to several hundred millivolts. Therefore, R16, R19 and R22 are added to protect Q1, Q2, and Q4, respectively, from inadvertently turning ON.

Even though the invention prevents the CPE from seizing the telephone line when there are modem signals on the telephone line, an embodiment of the present invention allows the modem signals to still be heard as a form of indication to the CPE user. The conventional audio path for a CPE (i.e. telephone) is through a transformer T101 or a similar component or circuit. When the telephone line is disconnected from transformer T101, audio signals are prevented from passing to the telephone's loudspeaker or handset earphone. However, even though the telephone is prevented from actually seizing the telephone line, in order to provide an indication to the user that a modem is currently in use, the present invention allows modem signals to be passed to the loudspeaker or handset earphone. Therefore, whenever the output of U1B (pin 7) is LOW, which indicates that modem signals are detected on the telephone line, the audio signals received over the telephone line are routed from the output of the differential amplifier circuit 300 through transistor Q5, thereby allowing the user to hear the modem signals even through the telephone line is not seized.

Having described the principles and preferred embodiments of the invention with reference to the accompanying drawings, it will be appreciated that the present invention is not limited to those specific embodiments, and that various modifications can be effected thereto by one of ordinary skill in the art without departing from the scope or spirit of the invention, as described in the appended claims.

What is claimed is:

1. An apparatus for controlling the seizure of a telephone mine and preventing a second consumer premises equipment from going off-hook based upon signals being sent over the telephone line by or to a first consumer premises equipment, comprising:

a detector for detecting a modem signal sent by or sent to the first consumer premises equipment on said telephone line;

a telephone line interface coupling said detector to said telephone line, and enabling said detector to monitor said telephone line without interfering with any modem signals on said telephone line;

a speech network coupled to the second consumer premises equipment for processing receive and transmit audio signals;

a microprocessor coupled to said detector for providing a control signal; and a switch responsive to said control signal for selectively coupling said speech network and the second consumer premises equipment to said telephone line interface, said switch non-coupling said telephone line interface to said speech network and the second consumer premises equipment when said detector detects said modem signal on said telephone line such that the second consumer premises equipment is prevented from going off-hook.

2. The apparatus as described in claim 1, wherein said switch operatively couples said telephone line interface to said speech network when said detector does not detect said modem signal on said telephone line.

3. The apparatus as described in claim 1, wherein said telephone line interface comprises a high impedance interface.

4. The apparatus as described in claim 1, wherein said detector comprises an envelope detector.

5. The apparatus as described in claim 1, wherein said detector comprises a carrier detector.

6. The apparatus as described in claim 1 further comprising a dial tone rejection circuit.

7. The apparatus as described in claim 6, wherein the dial tone rejection circuit comprises:

a line-in-use detector coupled to said telephone line for detecting when said telephone line is seized; and a ring detector coupled to said telephone line for detecting a ring signal on said telephone line.

8. The apparatus as described in claim 6, wherein said dial tone rejection circuit comprises a plurality of filters.

9. The apparatus as described in claim 1, further comprising an indicator for providing an indication when there are said modem signals on said telephone line.

10. The apparatus as described in claim 9, wherein said indicator provides a visual indication of when there are said modem signals on said telephone line.

11. The apparatus as described in claim 9, wherein said indicator provides an audible indication of when there are said modem signals on said telephone line.

12. The apparatus as described in claim 11, wherein said audible indication is provided by transmitting said modem signals to an earphone or a loudspeaker.

13. The apparatus as described in claim 1, wherein said telephone line interface comprises a filter for providing signal filtering and rejection of common mode signals received over said telephone line.

14. The apparatus as described in claim 13, further comprising a second filter for providing additional signal filtering and common mode rejection of signals received over said telephone line to prevent unwanted signals from being passed to the detector.

15. The apparatus as described in claim 14, wherein said second filter comprises a bandpass filter.

16. A method of controlling the seizure of a telephone line and preventing a second consumer premises equipment from going off-hook based upon signals being sent over the telephone line by or to a first consumer premises equipment, said method comprising the steps of:

a) detecting whether there are modem signals sent by or sent to the first consumer premises equipment on said telephone line;

b) preventing the seizure of said telephone line by the second consumer premises equipment if said modem signals are detected on said telephone line; and c) allowing the seizure of said telephone line by the second consumer premises equipment if said modem signals are not detected on said telephone line.

17. The method as described in claim 16, wherein step a) further comprises:

continuously monitoring the telephone line for modem signals.

18. The method as described in claim 16, wherein step a) further comprises:

periodically monitoring the telephone line for modem signals.

19. The method as described in claim 16, wherein step a) is accomplished without seizing said telephone line.

20. The method as described in claim 16, wherein step a) further comprises:

measuring the energy of the audio band of a received signal.

21. The method as described in claim 20, wherein step b) is performed if said energy of said received audio band is greater than a threshold value.

22. The method as described in claim 16, further comprising:

distinguishing a dial tone from said modem signal.

23. The method as described in claim 22, further comprising:

allowing the seizure of said telephone line if said dial tone is detected on said telephone line.

24. The method as described in claim 22, wherein the step of distinguishing said dial tone from said modem signal comprises the steps of:
1) detecting when said telephone line is in use;
2) detecting a constant signal on said telephone line having an audio energy level greater than a predetermined value;
3) determining whether a ring signal was detected less than a first predetermined period of time prior to detection of the telephone line being in use;
4) determining if the step 1) occurred within a second predetermined period of time; and
5) determining that said detected constant signal is a dial tone if said ring signal was not detected less than said first predetermined period of time prior to detection of said telephone line being in use and if said telephone line was detected to be in use within said second predetermined period of time.

25. The method as described in claim 16, further comprising:
detecting whether said telephone line is seized.

26. The method as described in claim 16, further comprising:
providing an indication as to whether there are modem signals on said telephone line.

27. The method as described in claim 26, wherein the step of indicating whether there are modem signals on said telephone line comprises:
providing visual indication as to whether there are modem signals on said telephone line.

28. The method as described in claim 26, wherein the step of indicating whether there are modem signals on said telephone line comprises:
providing audible indication as to whether there are modem signals on said telephone line.

29. The method as described in claim 28, wherein said audible indication step comprises transmitting said modem signal to an earphone or a loudspeaker.

30. The method as described in claim 16, further comprising:
preventing execution of step a) if modem signals are not detected on said telephone line.

31. The method as described in claim 16, further comprising:
maintaining the seizure of said telephone line even if modem signals are subsequently detected on the telephone line during the seizure of said telephone line.

32. The method as described in claim 16, further comprising:
allowing the seizure of said telephone line after said modem signals are detected on said telephone line if the step b) is overridden.

33. An apparatus for controlling connection to a telephone line and preventing a second consumer premises equipment from going off-hook based upon signals being sent over the telephone line by or to a first consumer premises equipment, comprising:
a detector for detecting signals on said telephone line, said detector discriminating between modem signals and speech signals on said telephone line;
a telephone line interface coupling said detector to said telephone line for enabling said detector to monitor said telephone line without interfering with any modem signals on said telephone line; and
a coupling circuit having an input port and an output port, the coupling circuit input port being coupled to said telephone line, said coupling circuit selectively coupling said telephone line to said output port, wherein said coupling circuit does not couple said telephone line to said output port whenever said detector detects said modem signals on said telephone line such that the second consumer premises equipment is prevented from going off-hook.

34. The apparatus as described in claim 33, further comprising:
a telephone operatively coupled to said output port of said coupling circuit.

35. The apparatus as described in claim 33, wherein said coupling circuit operatively couples said telephone line to said output port whenever said detector does not detect said modem signals on said telephone line.

36. The apparatus as described in claim 33, wherein said modem signals comprise signals having an audio energy level at least as high as a predetermined value.

37. The apparatus as described in claim 33, wherein said speech signals comprise signals having an audio energy level below a predetermined value.

38. The apparatus as described in claim 33, wherein said telephone line interface comprises a high impedance interface.

39. The apparatus as described in claim 33, wherein said detector comprises an envelope detector.

40. The apparatus as described in claim 33, wherein said detector comprises a carrier detector.

41. The apparatus as described in claim 33, further comprising a dial tone rejection circuit.

42. The apparatus as described in claim 41, wherein the dial tone rejection circuit comprises:
a line-in-use detector coupled to said telephone line for detecting when said telephone line is seized; and
a ring detector coupled to said telephone line for detecting a ring signal on said telephone line.

43. The apparatus as described in claim 41, wherein said dial tone rejection circuit includes a plurality of filters.

44. The apparatus as described in claim 33, further comprising:
an indicator for indicating when said modem signals are detected as being present on said telephone line.

45. The apparatus as described in claim 44, wherein said indicator provides a visual indication of when said modem signals are detected as being present on said telephone line.

46. The apparatus as described in claim 44, wherein said indicator provides an audible indication of when said modem signals are detected as being present on said telephone line.

47. The apparatus as described in claim 46, further comprising a receiver.

48. The apparatus as described in claim 47, wherein said audible indication is provided by transmitting said modem signals to a receiver.

49. The apparatus as described in claim 47, wherein said audible indication is provided by transmitting one or more audible signals to said receiver.

50. The apparatus as described in claim 44, further comprising:
an override circuit enabling said coupling circuit to operatively couple said telephone line to said output port even if said detector detects the presence of said modem signals on said telephone line.

51. The apparatus as described in claim 33, further comprising:

a filter for signal filtering and common mode rejection of signals received over said telephone line.

52. The apparatus as described in claim 33, wherein said line interface comprises:
a filter for providing signal filtering and common mode rejection of signals received over said telephone line.

53. The apparatus as described in claim 51, further comprising:
a second filter for providing additional signal filtering and common mode rejection of signals received over said telephone line to prevent unwanted signals from being passed to said detector.

54. The apparatus as described in claim 53, wherein said second filter comprises a bandpass filter.

55. An apparatus for indicating the presence of modem signals on a telephone line and determining whether a second consumer premises equipment should be permitted to go off-hook based upon the presence of modem signals being sent by or to a first consumer premises equipment over the telephone line, comprising:
a detector for detecting signals on said telephone line and discriminating between modem signals and speech signals on said telephone line;
a telephone line interface coupling said detector to said telephone line for enabling said detector to monitor said telephone line without interfering with modem signals present on said telephone line, said telephone line interface being a high impedance interface; and
an indicator for indicating when said detector detects modem signals on said telephone line such that when modem signals are present on said telephone line, the second consumer premises equipment is prevented from going off-hook with respect to said telephone line.

56. The apparatus as described in claim 55, wherein said indicator provides an audible indication of the presence of modem signals on said telephone line.

57. The apparatus as described in claim 56, wherein said audible indication is provided by transmitting said modem signals to a receiver.

58. The apparatus as described in claim 57, wherein said audible indication is provided by transmitting one or more audible signals to a receiver.

59. The apparatus as described in claim 55, wherein said indicator provides a visible indication of the presence of modem signals on said telephone line.

60. The apparatus as described in claim 59, wherein said visual indication is provided via a light emitting diode.

61. The apparatus as described in claim 59, wherein said visual indication is provided via a liquid crystal display.

62. A telephone apparatus which controls the seizure of a telephone line and prevents a second consumer premises equipment from going off-hook based upon signals being sent over the telephone line by or to a first consumer premises equipment, comprising:
a detector for detecting signals sent by or to the first consumer premises equipment on said telephone line, said detector discriminating between modem signals and speech signals present on said telephone line;
a telephone line interface coupling said detector to said telephone line for enabling said detector to monitor said telephone line without interfering with modem signals present on said telephone line; and
a line seizure circuit for selectively coupling said telephone line to said telephone apparatus, wherein said line seizure circuit is prevented from operatively coupling said telephone line to said telephone apparatus whenever said detector detects said modem signals on said telephone line such that said second consumer premises equipment is prevented from going off-hook with respect to said telephone line.

63. The telephone apparatus as described in claim 62, wherein said line seizure circuit allows the operative coupling of said telephone line to said telephone apparatus when said detector detects said speech signals on said telephone line.

64. The telephone apparatus as described in claim 62, wherein said modem signals comprise signals having an audio energy level at least as high as a predetermined value.

65. The telephone apparatus as described in claim 62, wherein said speech signals comprise signals having an audio energy level below a predetermined value.

66. The telephone apparatus as described in claim 62, wherein said telephone line interface comprises a high impedance interface.

67. The telephone apparatus as described in claim 62, wherein said detector comprises an envelope detector.

68. The telephone apparatus as described in claim 62, wherein said detector comprises a carrier detector.

69. The telephone apparatus as described in claim 62, further comprising a dial tone rejection circuit.

70. The telephone apparatus as described in claim 69, wherein the dial tone rejection circuit includes:
a line-in-use detector coupled to said telephone line for detecting when said telephone line is seized; and
a ring detector coupled to said telephone line for detecting a ring signal on said telephone line.

71. The telephone apparatus as described in claim 69, wherein said dial tone rejection circuit includes a plurality of filters.

72. The telephone apparatus as described in claim 62, further comprising an indicator for providing an indication as to when there are said modem signals on said telephone line.

73. The telephone apparatus as described in claim 72, wherein said indicator provides a visual indication as to when there are said modem signals on said telephone line.

74. The telephone apparatus as described in claim 72, wherein said indicator provides an audible indication as to when there are said modem signals on said telephone line.

75. The telephone apparatus as described in claim 74, further comprising a receiver.

76. The telephone apparatus as described in claim 75, wherein said audible indication is provided by transmitting said modem signals to a receiver.

77. The telephone apparatus as described in claim 75, wherein said audible indication is provided by transmitting one or more audible signals to said receiver.

78. The telephone apparatus as described in claim 72, further comprising an override circuit wherein said override circuit allows said line seizure circuit to operatively couple said telephone line to said telephone apparatus even if said detector detects said modem signals on said telephone line.

79. The telephone apparatus as described in claim 62, wherein said line interface further comprises:
a filter for providing signal filtering and common mode rejection of signals received over said telephone line.

80. The telephone apparatus as described in claim 62, further comprising a filter for signal filtering and common mode rejection of signals received over said telephone line.

81. The telephone apparatus as described in claim 80, further comprising:
a second filter for providing additional signal filtering and common mode rejection of signals received over said telephone line to prevent unwanted signals from being passed to the detector.

82. The telephone apparatus as described in claim 81, wherein said second filter comprises a bandpass filter.

83. An apparatus for controlling the coupling of a second consumer premises equipment to a telephone line based upon signals sent over the telephone line by or to a first consumer premises equipment, comprising:

an off-hook sensor for detecting when said telephone line is seized by the first consumer premises equipment;

a detector for detecting modem signals on said telephone line after said off-hook sensor detects that said telephone line is seized by the first consumer premises equipment; and a coupling circuit having an input port and an output port, the coupling circuit input port being coupled to said telephone line, said coupling circuit selectively coupling said telephone line to said output port, wherein said coupling circuit does not couple said telephone line to said output port whenever said detector detects said modem signals on said telephone line such that the second consumer premises equipment is prevented from going off-hook with respect to said telephone line.

84. A telephone apparatus as described in claim 83, further comprising an indicator for providing an indication as to when there are said modem signals on said telephone line.

85. A telephone apparatus as described in claim 84, further comprising:

an override circuit enabling said coupling circuit to operatively couple said telephone line to said telephone apparatus even if said detector detects the presence of said modem signals on said telephone line.

86. A telephone apparatus which controls the seizure of a telephone line and prevents a second consumer premises equipment from going off-hook based upon signals being sent over the telephone line by or to a first consumer premises equipment, comprising:

an off-hook sensor for detecting when said telephone line is seized by the first consumer premises equipment;

a detector for detecting modem signals on said telephone line after said off-hook sensor detects that said telephone line is seized by the first consumer premises equipment; and a line seizure circuit for selectively coupling said telephone line to said telephone apparatus, wherein said line seizure circuit is prevented from operatively coupling said telephone line to said telephone apparatus whenever said detector detects said modem signals on said telephone line such that the second consumer premises equipment is prevented from going off-hook with respect to said telephone line.

87. A telephone apparatus as described in claim 86, further comprising:

an indicator for providing an indication as to when there are said modem signals on said telephone line.

88. A telephone apparatus as described in claim 87, further comprising:

an override circuit enabling said line seizure circuit to operatively couple said telephone line to said telephone apparatus even if said detector detects the presence of said modem signals on said telephone line.

89. A telephone apparatus which controls the seizure of a telephone line and prevents a second consumer premises equipment from going off-hook based upon signals being sent over the telephone line by or to a first consumer premises equipment, comprising:

a detector for detecting the presence of modem signals on said telephone line sent by or to the first consumer premises equipment;

an indicator for indicating the presence of modem signals sent by or to the first consumer premises equipment on said telephone line;

a line seizure circuit for selectively coupling said telephone line to said telephone apparatus, wherein said line seizure circuit is prevented from operatively coupling said telephone line to said telephone apparatus whenever said detector detects the presence of modem signals on said telephone line such that the second consumer premises equipment is prevented from going off-hook with respect to said telephone line.

90. The telephone apparatus as described in claim 89, wherein said detector comprises a line-in-use detector.

91. The telephone apparatus as described in claim 89, further comprising:

an override circuit enabling said line seizure circuit to operatively couple said telephone line to said telephone apparatus even if said detector detects the presence of said modem signals on said telephone line.

* * * * *